(12) United States Patent
Miyata

(10) Patent No.: US 7,916,353 B2
(45) Date of Patent: Mar. 29, 2011

(54) PRINT CONTROL DEVICE AND PROGRAM

(75) Inventor: Yuji Miyata, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 360 days.

(21) Appl. No.: 12/071,080

(22) Filed: Feb. 15, 2008

(65) Prior Publication Data

US 2008/0198395 A1 Aug. 21, 2008

(30) Foreign Application Priority Data

Feb. 16, 2007 (JP) .................................. 2007-036373

(51) Int. Cl.
*H04N 1/40* (2006.01)
*G06K 9/00* (2006.01)

(52) U.S. Cl. ...................... 358/3.28; 382/100; 382/162

(58) Field of Classification Search .................. None
See application file for complete search history.

(56) References Cited

U.S. PATENT DOCUMENTS

| 5,808,682 | A | * | 9/1998 | Okunoki et al. | ......... | 375/240.01 |
| 7,149,451 | B2 | | 12/2006 | Uchida et al. | | |
| 2005/0174590 | A1 | * | 8/2005 | Kubo | .......................... | 358/1.9 |
| 2007/0139714 | A1 | * | 6/2007 | McElvain | ..................... | 358/3.06 |

FOREIGN PATENT DOCUMENTS

| JP | 07-074928 | 3/1995 |
| JP | 7-154581 | 6/1995 |
| JP | 7-203194 | 8/1995 |
| JP | 10-191023 | 7/1998 |
| JP | 10-210312 | 8/1998 |
| JP | 2001-53964 | 2/2001 |
| JP | 2003-158638 | 5/2003 |
| JP | 2005-136954 A | 5/2005 |

OTHER PUBLICATIONS

Mordy Golding Real World Adobe Illustrator CS2 Copyright 2006 Peachpit Press pp. 73, 88, 89, 174.*
Japanese Office Action, with English translation, issued in Japanese Patent Application No. 2007-036373, mailed Mar. 17, 2009.
Decision of Rejection for Japanese Application 2007-036373 mailed on Sep. 8, 2009.
Decision of Dismissal of Amendment for Japanese Application 2007-036373 mailed on Sep. 8, 2009.
Notification of Reasons of Rejection in Japanese Application No. 2007-036373 dispatched Jun. 9, 2009 and English translation thereof.

* cited by examiner

*Primary Examiner* — Twyler L Haskins
*Assistant Examiner* — Barbara D Reinier
(74) *Attorney, Agent, or Firm* — Banner & Witcoff, Ltd.

(57) ABSTRACT

Print data representing a superimposed image is generated by developing the main image on a first memory area, developing an additional image on the first memory area so as to be overlaid on the main image and on a second memory area having the same size of the first memory area. A first color conversion is applied to the image on the first memory for portions not corresponding to the image on the second memory area. A second color conversion, which is independent of the first color conversion, is applied to other portions of the image on the first memory for portions corresponding to the image on the second memory area. The image developed on the first memory area is output as the print data after the first color conversion and the second color conversion are applied.

10 Claims, 9 Drawing Sheets

PRINT CONTROL DEVICE AND PROGRAM

CROSS-REFERENCE TO RELATED APPLICATION

This application claims priority under 35 U.S.C. §119 from Japanese Patent Application No. 2007-036373 filed on Feb. 16, 2007. The entire subject matter of the application is incorporated herein by reference.

BACKGROUND

1. Technical Field

The following description relates to a print control device which is configured to output print data to be printed by a printing device based on image data generated by an application, etc. Specifically, the description relates to a print control device capable of outputting the print data representing a superimposed image which is a main image generated by the application and an additional image, such as a watermark, superimposed on the main image. The invention also relates to a computer accessible recording medium containing a program, which, when executed by the computer, causes the computer as the print control device.

2. Related Art

Conventionally, there is known a print control device which is configured to output print data to be printed by a printing device based on image data generated by an application. Among such print control devices, there is known a print control device having a color conversion function. With the color conversion function, a desired print result can be obtained as colors of an image represented by the image data are converted as desired (e.g., the color is made brighter, redness of the image is enhanced, etc.) when the print data is created.

The image data sometimes represents an additional image such as a company logo, which should be printed in predetermined colors. When such an image is superimposed, as a watermark, on a main image generated by the application, and if the color conversion operation is performed with respect to the superimposed image so that the main image is printed in the predetermined colors, the color conversion is applied to not only the main image but also the additional image, although the color conversion should be directed only to the main image. In such a case, the additional image (e.g., the company logo) may not be printed in the predetermined color.

In order to deal with the above problem, there is provided a color conversion device which is configured to judge a color of each pixel of an superimposed image, and apply a specific color conversion process, which is to be applied only to the image data of the additional image, to the pixels having the colors of the additional image (e.g., the company logo). An example of such a color conversion device is disclosed in the Japanese Patent Provisional Publication No. HEI 10-210312 (hereinafter, referred to the '312 publication).

SUMMARY OF THE INVENTION

According to the color conversion device of the '312 publication, however, when the main image contains pixels having the same color as the pixels of the additional image, all the corresponding pixels of the main image are also converted in accordance with the specific color conversion process. In particular, when the main image contains relatively large amount of pixels having the specific color (e.g., the color used in the company logo), the color of the main image as printed might become unnatural. If the additional image includes a plurality of colors, the above problem will be more significant. It should be noted that even if the additional image is not a company logo but any other images, the same problem would occur if the color conversion is applied based on the colors of each pixel.

In consideration of the above problem, the present invention is advantageous in that an improved print control device is provided, with which the color conversions with respect to the main image and the additional image are performed separately, even if the main image and additional image have the same color pixels.

According to aspects of the invention, there is provided a print control device, which is provided with a superimposing unit configured to generate superimposed image data representing a superimposed image of a main image represented by main image data and an additional image represented by additional image data, a position storing unit configured to store a position of the additional image with respect to the main image, a first color conversion unit configured to apply a first color conversion to part of the superimposed image data, which (i.e., the part of the superimposed image data) corresponds to the superimposed image at a position other than the position of the additional image stored in the position storing unit, a second color conversion unit configured to apply a second color conversion to the other part of the superimposed image data which (i.e., the other part of the superimposed image data) corresponds to the superimposed image at the position of the additional image stored in the position storing unit, and an output unit configured to output the superimposed image data to which the first and the second color conversion operation are performed, as print data.

With the above configurations, the color conversion operation is performed with respect to the main image and the additional image separately, independent of colors thereof.

According to aspects of the present invention, there is provided a print control device which generates a superimposed image by superimposing an additional image represented by additional image data on a main image represented by main image data and outputs print data representing the superimposed image to be printed by a printer. The print control device is provided with a main image developing unit configured to develop the main image on a first memory area based on the main image data, a superimposed image developing unit configured to develop the additional image on the first memory area so as to be superimposed on the main image based on the additional image data, a reference image developing unit configured to develop the additional image on a second memory area which has the same size of the first memory area.

The print control device further includes a first color conversion applying unit configured to apply a first color conversion to the image developed on the first memory area such that the first color conversion is applied to portions, which do not correspond to the image developed on the second memory area, of the image developed on the first memory area, a second color conversion applying unit configured to apply a second color conversion to the image developed on the first memory area such that the second color conversion is applied to other portions, which correspond to the image developed on the second memory area, of the image developed on the first memory area and a print data output unit configured to output the print data representing the image in the first memory area after the first color conversion and the second color conversion are applied.

According to another aspect of the invention, a print control device is provided with a first color conversion applying unit configured to apply a first color conversion to main image data, a second color conversion applying unit configured to apply a second color conversion to additional image data, a superimposing unit configured to generate superimposed image data representing the main image on which the additional image is superimposed after the first color conversion and the second color conversion are applied, and a print data output unit configured to output the superimposed image data as the print data.

According to a further aspect of the invention, there is provided a computer accessible recording medium containing a program which, when executed by a computer, causes the computer to generate a superimposed image by superimposing an additional image represented by additional image data on a main image represented by main image data and output print data representing the superimposed image to be printed by a printer. The program contained in the recording medium causes the computer to execute the steps of developing the main image on a first memory area based on the main image data, developing the additional image on the first memory area so as to be superimposed on the main image based on the additional image data, developing the additional image on a second memory area which has the same size of the first memory area, applying a first color conversion to the image developed on the first memory area such that the first color conversion is applied to portions, which do not correspond to the image developed on the second memory area, of the image developed on the first memory area, applying a second color conversion, which is independent of the first color conversion, to the image developed on the first memory area such that the second color conversion is applied to other portions, which correspond to the image developed on the second memory area, of the image developed on the first memory area, and outputting the print data representing the image in the first memory area after the first color conversion and the second color conversion are applied.

According to a furthermore aspect of the invention, the program causes a computer to execute the steps of applying a first color conversion to main image data, applying a second color conversion, which is independent of the first color conversion, to additional image data, generating superimposed image data representing the main image on which the additional image is superimposed after the first color conversion and the second color conversion are applied, and outputting the superimposed image data as the print data.

BRIEF DESCRIPTION OF THE ACCOMPANYING DRAWINGS

DETAILED DESCRIPTION

Hereinafter, embodiments of the present invention will be described with reference to the accompanying drawings.

Figure 1:
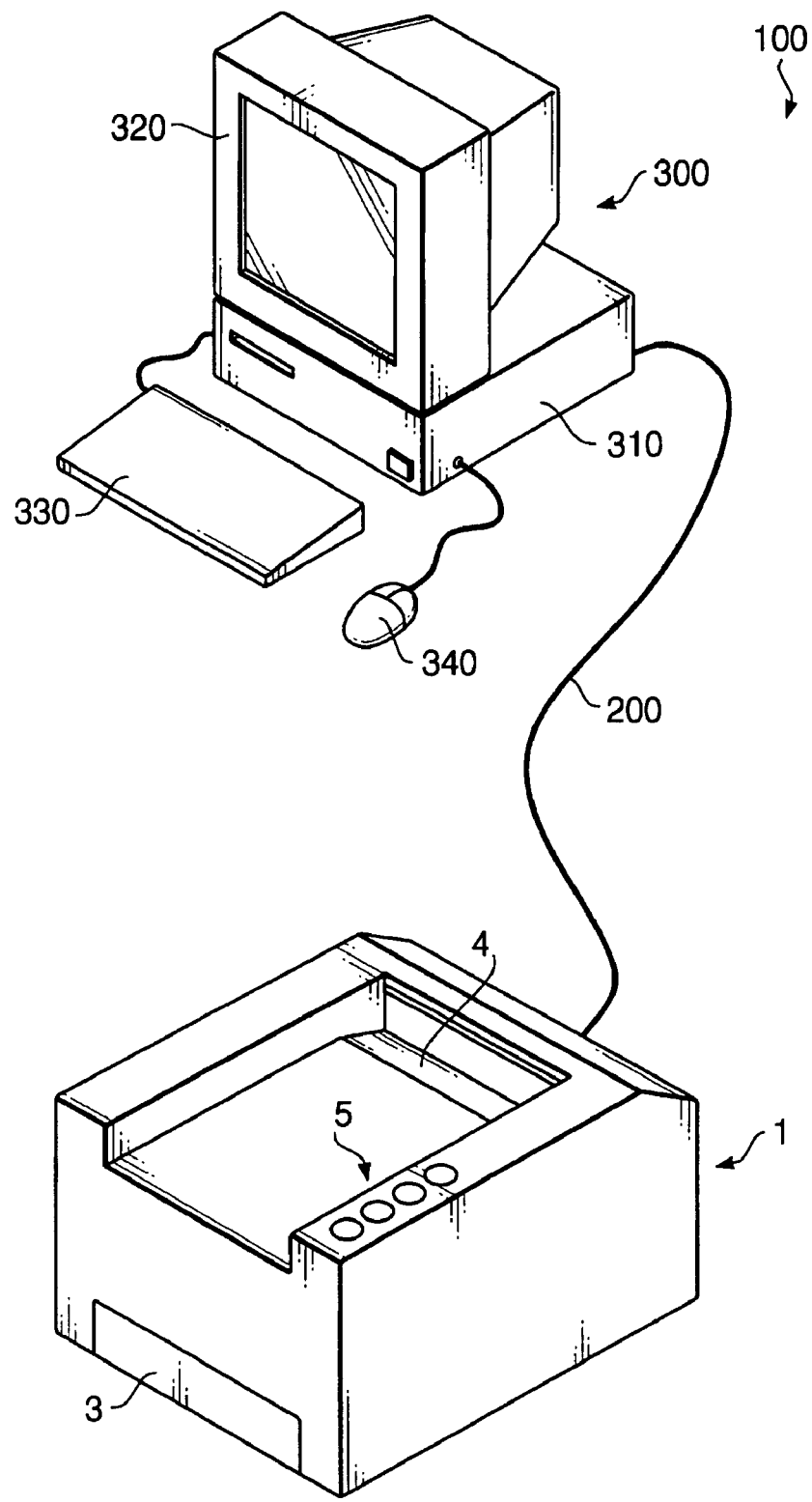
FIG. 1 is a perspective view of a print system to which a print control device according to embodiments of the invention is applied.

FIG. 1 is a perspective view of a print system 100 to which the print control device according to the invention is applicable. As shown in FIG. 1, the print system 100 is provided with a color laser printer (hereinafter, simply referred to as the "printer") 1, a personal computer (hereinafter, referred to as the "PC") 300 which serves as the print control device according to the present invention. The PC 300 is implemented with a printer driver (not shown), which controls printing jobs.

In an example shown in FIG. 1, the printer 1 and the PC 300 are directly connected with a cable 200. It should be noted that a configuration of the print system 100 need not be limited to the configuration shown in FIG. 1, and the printer 1 and the PC 300 may be configured to communicate using infrared light communication system, or the printer 1 and the PC 300 may be interconnected via a network such as a LAN (Local Area Network).

The printer 1 is provided with a well-known printer engine 2 (see FIG. 2) which is configured to form a color image in accordance with an electrophotographic imaging method, using yellow, magenta, cyan and black toners. The printer engine 2 forms an image on each of printing sheets (not shown) which is accommodated in a sheet tray 3 and fed one by one. The printing sheet on which the image is formed is discharged from the printer 1 and stacked on a stacker 4 one by one. As shown in FIG. 1, on an upper surface of the printer 1, an operation panel 5 allowing the user to make various settings and input various instructions is provided.

Figure 2:
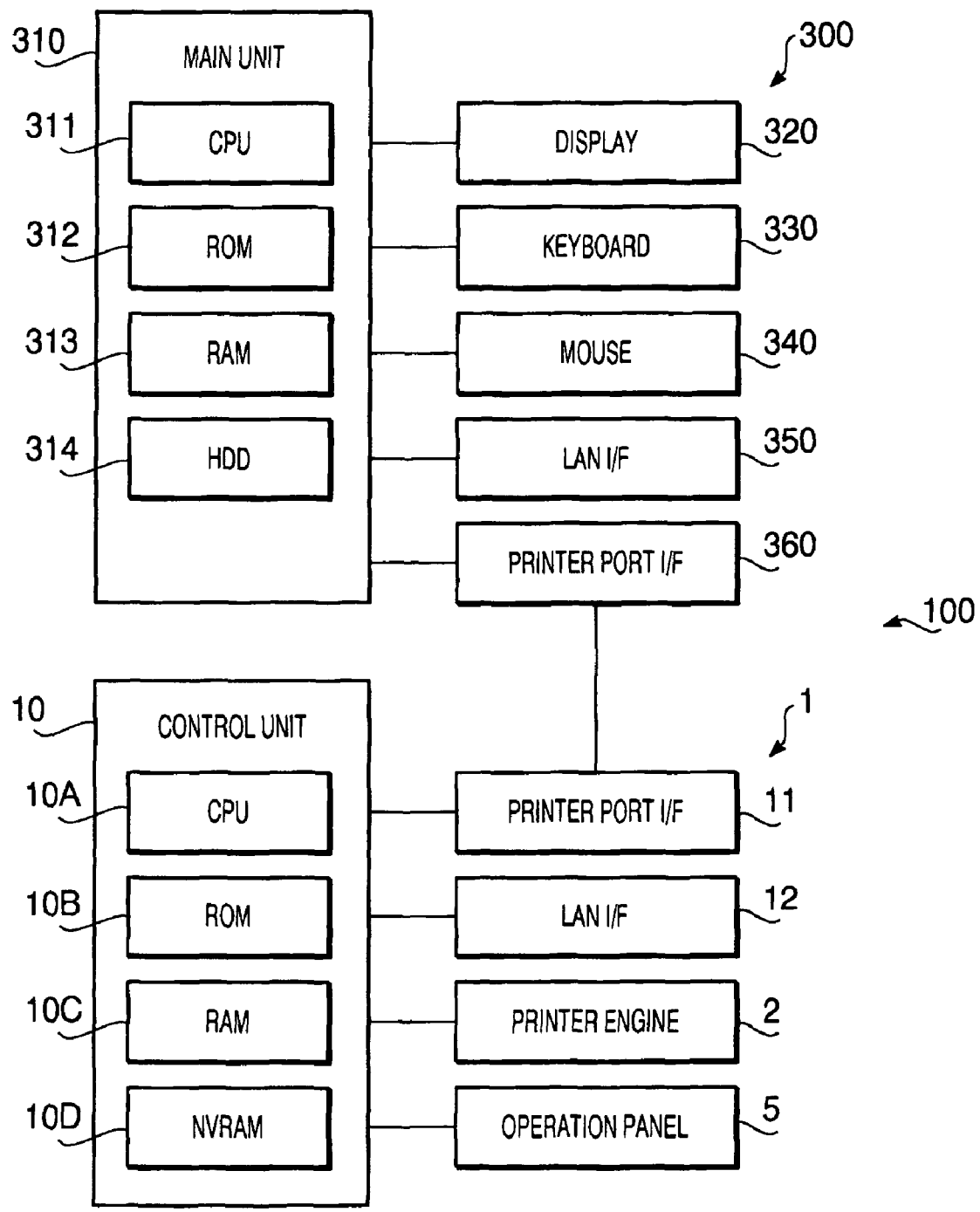
FIG. 2 is a block diagram showing a control system of the print system shown in FIG. 1.

FIG. 2 shows a block diagram schematically illustrating a configuration of a control system of the print system 100. As shown in FIG. 2, a main unit 310 of the PC 300 is provided with a CPU (Central Processing Unit) 311, a ROM (Read Only Memory) 312, a RAM (Random Access Memory) 313 and an HDD (Hard Disk Drive) 314.

Further, to the main unit 310, a display unit (e.g., CRT) 320, a keyboard 330 and a mouse 340 are connected as shown in FIG. 1. Further, the main unit 310 is connected with a LAN interface (I/F) 350 for connecting with a LAN (Local Area Network: not shown) and a printer port interface (I/F) 360 for connecting with the printer 1 with the cable 200.

The printer 1 is provided with a control unit 10 which controls the printer engine 2, etc. The control unit 10 is a microcomputer provided with the CPU 10A, ROM 10B and RAM 10C. The control unit 10 is further provided with an NVRAM (Non-Volatile RAM) 10D, which is configured such that data stored therein is not deleted even if the printer 1 is powered off.

The control unit 10 is connected with the printer engine 2 and the operation panel 5. Further, the control unit 10 is connected with a printer port interface (I/F) 11 for connecting with the PC 300 with the cable 200, and a LAN interface (I/F) 12 for connecting with the LAN. It should be noted that, via the LAN interfaces 12 and 350, the printer 1 and the PC 300 may be connected to a network such as the LAN.

Hereinafter, a print process executed by the control system shown in FIG. 2 will be described. Firstly, a main image to be printed is generated by one or a plurality of applications in the PC 300. Then, the printer driver installed in the PC 300 is activated for printing the main image. When a print instruction is made on the printer driver, the CPU 311 of the PC 300 displays a general UI (user interface) window to allow a user to set up various parameters relating to the print job, including a size of sheets, a range of printing, a selection of a watermark, and color conversion operation, etc. on the display 320. Then, when the color conversion operation is selected by the user, a color conversion parameter setting UI (user interface) 900 as shown in FIG. 3 is displayed on the display 320.

Figure 3:
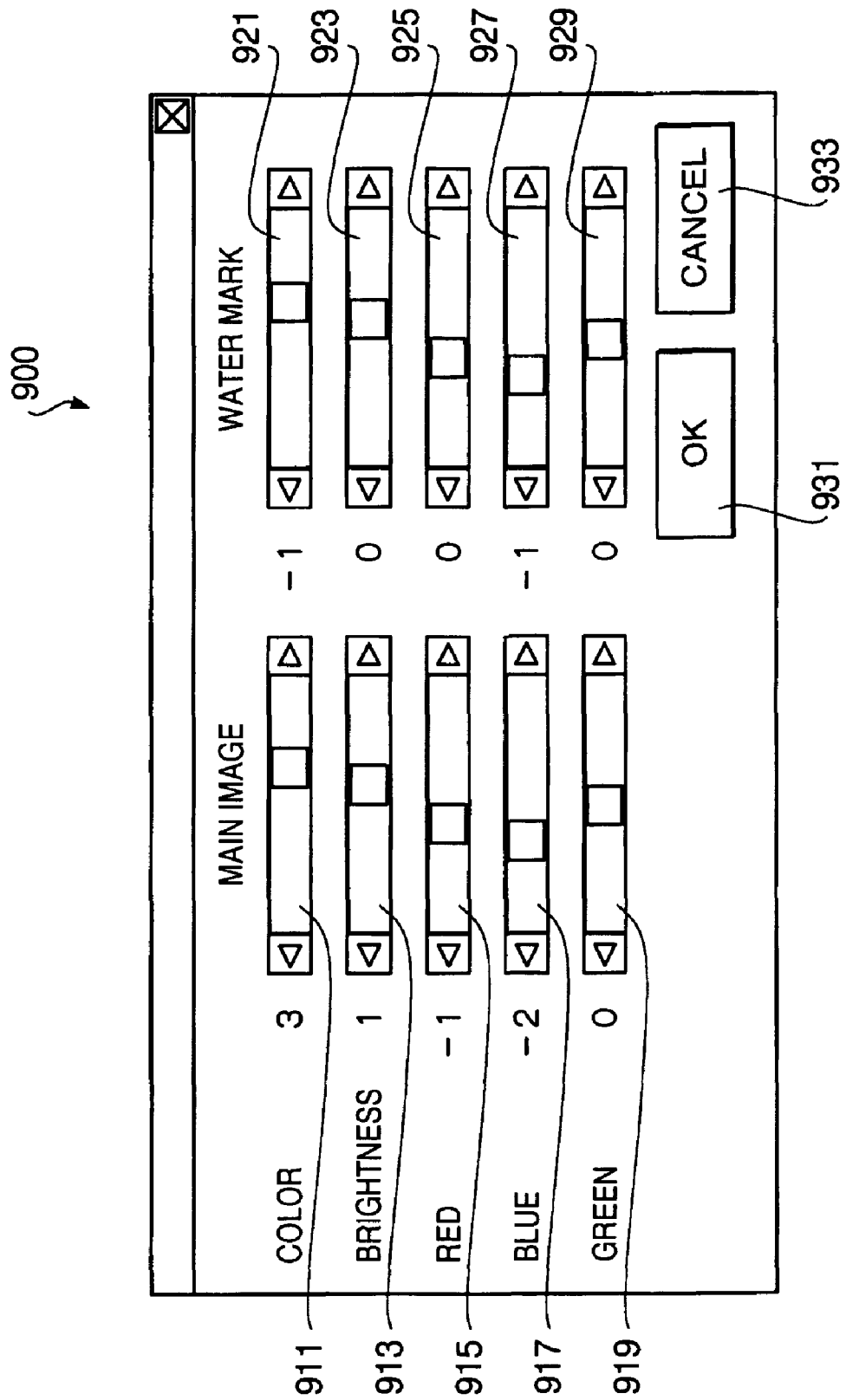
FIG. 3 shows an example of a color conversion parameter setting user interface displayed on a personal computer of the print system shown in FIG. 1.

As shown in FIG. 3, the color conversion parameter setting UI 900 includes a plurality of setting sections for setting parameters with respect to the main image, which include a hue setting section 911 for setting hue of the image, a brightness setting section 913 for setting brightness of the image, a red component setting section 915 for setting amplitude of the red component of the image, a green setting section 917 for setting amplitude of the green component of the image and a blue setting section 919 for setting amplitude of the blue component of the image.

The color conversion parameter setting UI 900 further includes a plurality of setting sections for setting parameters with respect to a watermark, which also includes a hue setting section 921 for setting hue of the watermark, a brightness setting section 923 for setting brightness of the watermark, a red setting section 925 for setting amplitude of the red component of the watermark, a green setting section 927 for setting amplitude of the green component of the watermark and a blue setting section 929 for setting the blue component of the watermark.

The color conversion parameter setting UI 900 further includes an OK button 931 and a cancel button 933. When the cancel button 933 is clicked, all settings made on the color conversion parameter setting UI 900 are canceled, while, when the OK button 931 is clicked, each setting made on the color conversion parameter setting UI 900 becomes effective. Then, the print process described hereinafter is performed based on the setting made on the color conversion parameter setting UI 900.

Figure 4:
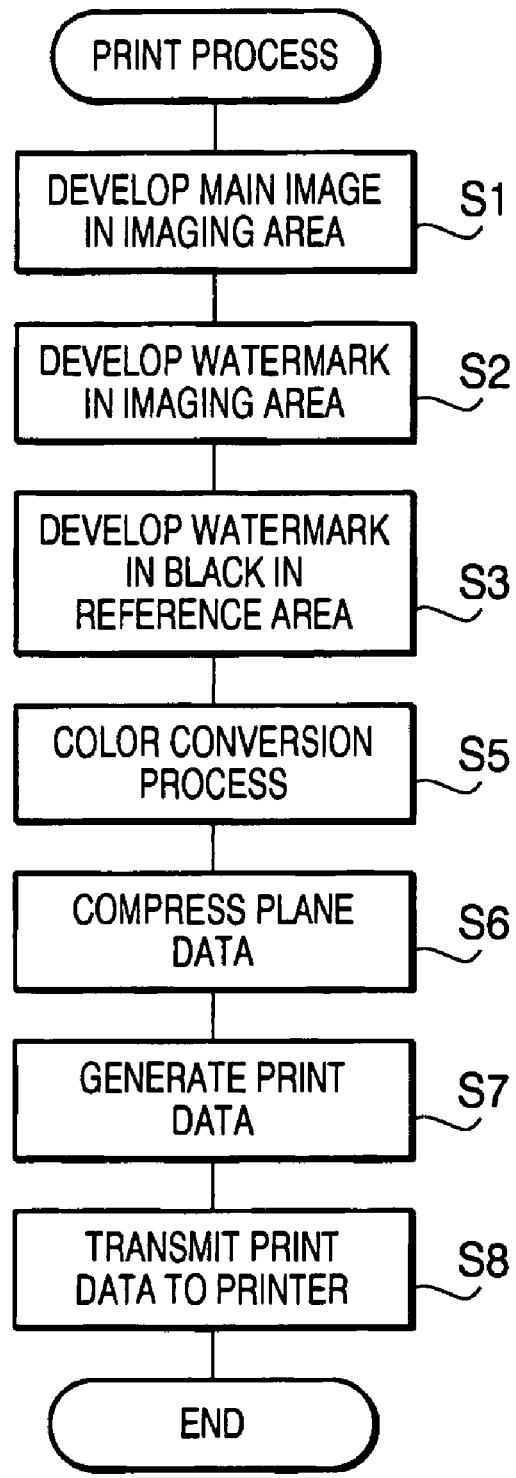
FIG. 4 is a flowchart illustrating a print process according to a first embodiment of the invention.
Figure 5A:
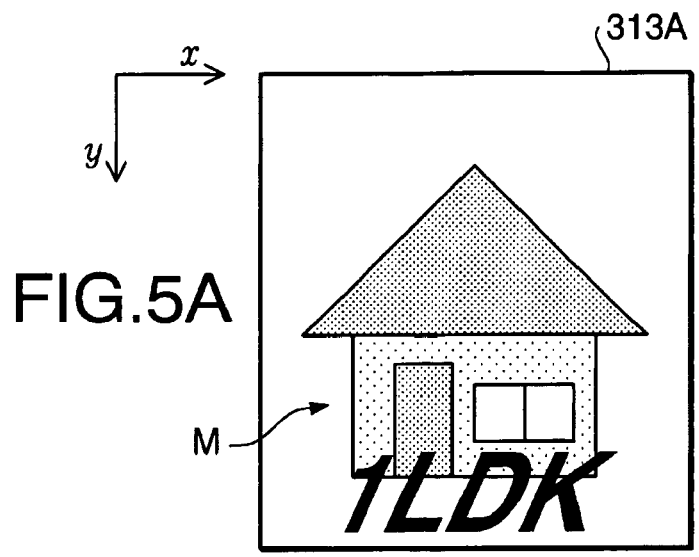
FIGS. 5A and 5B show examples of images developed in an imaging area according to the first embodiment of the invention.
Figure 5B:
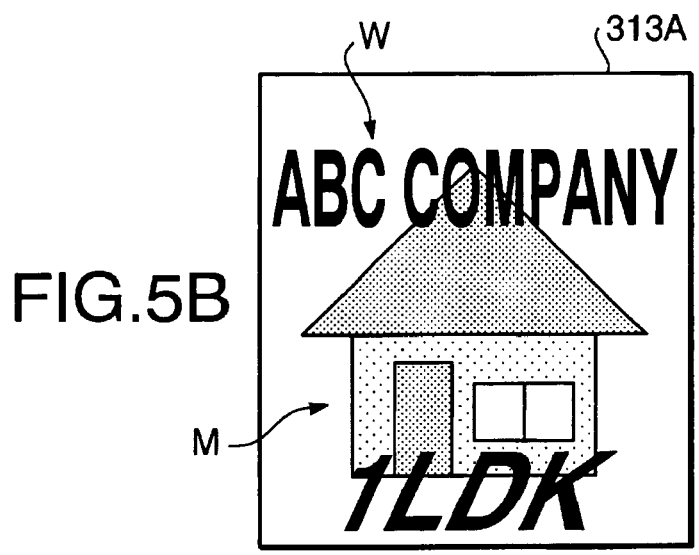
Figure 5C:
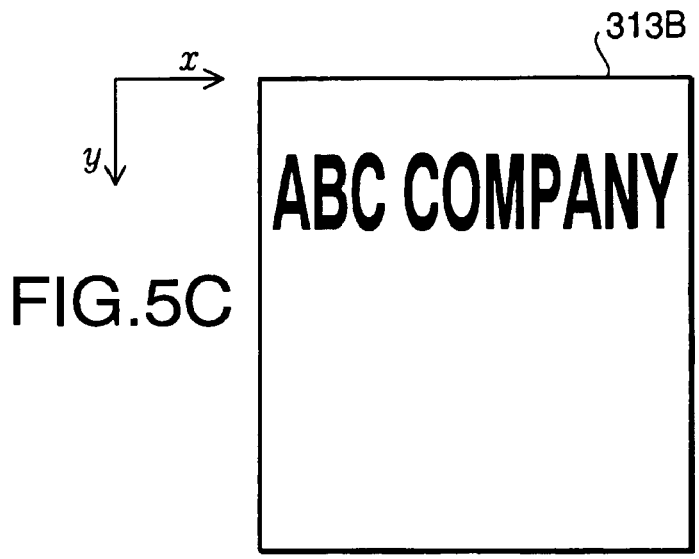
FIG. 5C shows an example of an image developed in a reference area according to the first embodiment of the invention.

FIG. 4 is a flowchart illustrating the print process executed by the PC 300 according to a first embodiment of the invention. Specifically, the print process is executed by the CPU 311 of the PC 300, in which a program to execute the print process is installed. FIGS. 5A-5C are examples of image data created in a imaging area and a reference area by the print process. The print process is initiated when the print instruction is made by the user.

As shown in FIG. 4, when the process is initiated, a main image corresponding to the main image data is developed in an imaging area 313A, which is provided in the RAM 313, in response to an image developing instruction regarding the main image (S1). Specifically, the main image data generated by the application is developed to a bitmap of the main image, and the bit map of the main image is stored in the imaging area 313A. In an example shown in FIG. 5A, a bitmap of the main image M (bitmap data) including a picture of a house and a character string of "1LDK" is developed in the imaging area 313A.

Then, a watermark W (bitmap data) is developed in the imaging area 313A (S2). In an example shown in FIG. 5B, the watermark data W, which is a logo of "ABC COMPANY", is superimposed (overwritten) on an upper side of the main image M with specific colors. It should be noted that the watermark W is preliminary stored in the RAM 313 in the PC300 and selected by the user through the general UI window of the printer driver. According to the steps S1 and S2, a superimposed image (bitmap data) is developed on the imaging area 313A. Since the watermark W overwrites the main image M, at a portion where a part of the watermark W overwrites a part of the main image, the color of the watermark W is retained in the imaging area 313A.

Subsequently, a bitmap of the watermark W is created in black in a reference area 313B (S3). That is, as shown in FIG. 5C, the bitmap of the watermark W is developed in black in the reference area 313B at a position corresponding to the watermark W in the imaging area 313A.

Then, the process executes a color conversion process with respect to the superimposed image in the imaging area 313A, with reference to the watermark W in the reference area 313B (S5).

Figure 6:
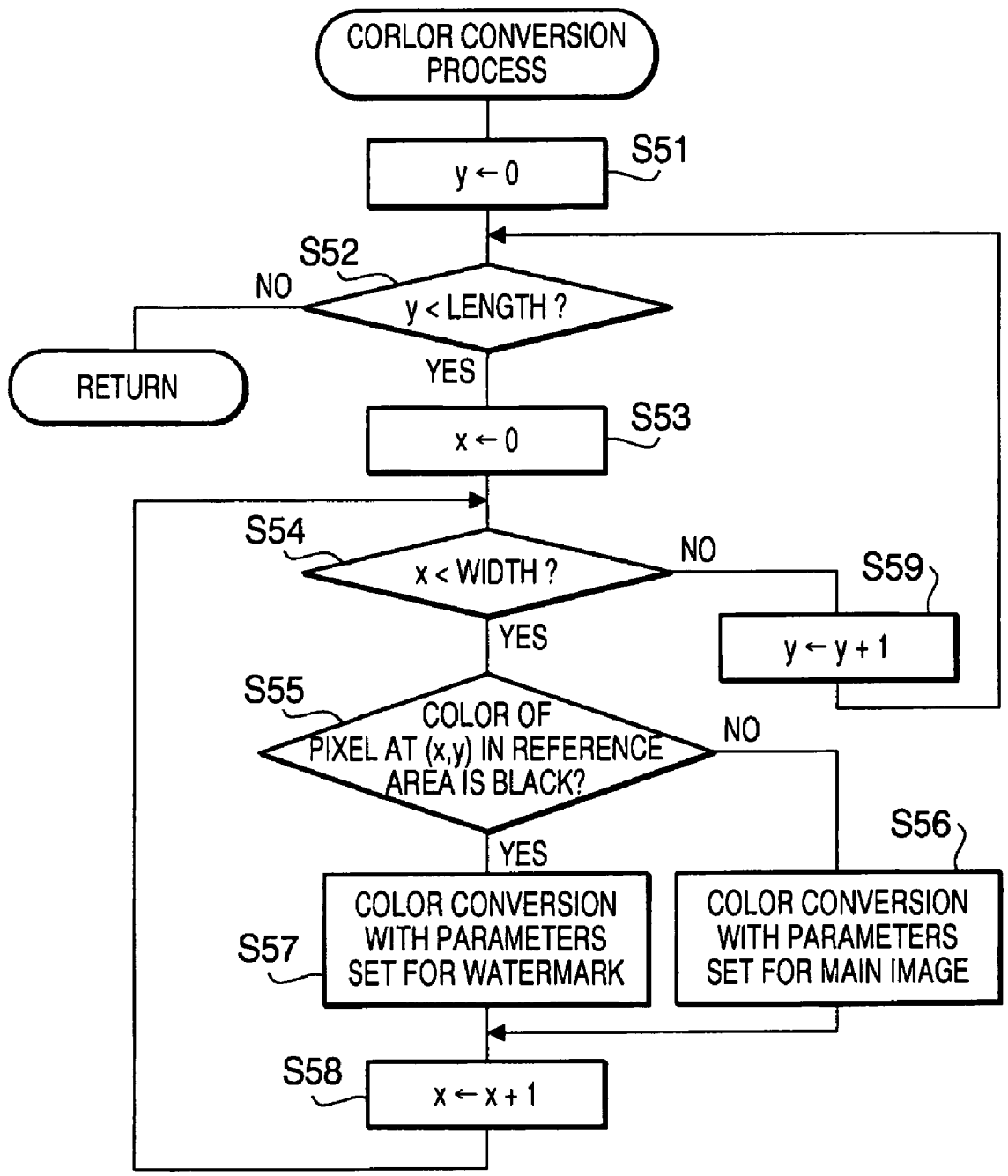
FIG. 6 is a flowchart illustrating a color conversion process according to embodiments of the invention.

FIG. 6 is a flowchart illustrating the color conversion process performed in S5. As shown in FIG. 6, firstly, the process defines an x-y coordinate in the imaging area 313A, and a value of y is set to "0" (S51).

Incidentally, pixels in the imaging area 313A are indicated by the x-y coordinate. For example, a pixel at an upper left corner of the imaging area 313A is defined as an original point of the x-y coordinate value. Specifically, a y coordinate indicates a pixel in a vertical (up-and-down) direction of the imaging area 313A and incremented by 1 as shifting one pixel downward. A x coordinate indicates a pixel in a horizontal (right-and-left) direction of the imaging area 313A and incremented by 1 as shifting one pixel to a right direction. Further, hereinafter, a number of pixels in the vertical direction is referred to as a length of the imaging area 313A and a number of pixels in the horizontal direction is referred to as a width of the imaging area 313A. It should be noted that the x-y coordinate is also defined in the reference area 313B in a same manner as above, and the length and the width of the reference area 313B coincide with those of the imaging area 313A.

Next, the process judges whether the value of y is less than the length of the imaging area 313A (S52). When the value of y is less than the length (S52: YES), the process goes to S53. In S53, a value of x is set to "0." Then, the process judges whether the value of x is less than the width of the imaging area 313A (S54). When the value of x is less than the width (S54: YES), the process goes to S55.

In S55, the process referrers to a color of a pixel at the current x-y coordinate in the reference area 313B based on the values of x and y, and judges whether the color is black or not. When the color of the pixel is not black (S55: NO), a color conversion operation is performed, with respect to a pixel at the x-y coordinate in the imaging area 313A, in accordance with the color conversion parameter for the main image (S56). If the color of the pixel is black (S55: YES), the color conversion operation is performed, with respect to the pixel at the x-y coordinate in the imaging area 313A, in accordance with the color conversion parameter for the watermark (S57). Then, the process goes to S58.

As described above, the color conversion process judges which pixel corresponds to the watermark W in the imaging area 313A, based on whether the pixel at the corresponding position in the reference area 313B is black (S55). Then, with respect to the pixels corresponding to the watermark W in the imaging area 313A, the color conversion operation is performed in accordance with parameters set in the setting sections 921 through 929 for the watermark as shown in FIG. 3. On the other hand, with respect to the pixels other than pixels corresponding to the watermark W in the imaging area 313A, the color conversion is performed in accordance with parameters set in the setting sections 911 through 919 for the main image as shown in FIG. 3. In the color conversion operations in S56 and S57, the color in pixel which is represented by data of multiple values of R (Red), G (Green), and B (Blue) are converted to data for printing, which is represented by multiple values of C (Cyan), M (Magenta), Y (Yellow), and K (Black).

Subsequently, the value of x is incremented by 1 (S58) and the process goes back to S54. Then, the steps S54 through S58 are repeated until the value x is greater or equal to the width of the imaging area 313A, so that all pixels in the horizontal direction of the imaging area 313A are judged. When the value x is greater or equal to the width of the imaging area 313A (S54: NO), the process goes to S59. In S59, the value of y is incremented by 1 and the process goes back to S52. Then, the steps S52 through S59 are repeated until the value y is greater or equal to the length of the imaging area 313A, so that all pixels in the vertical direction of the imaging area 313A are judged. When the value y is greater or equal to the length of the imaging area 313A (S52: NO), the process goes to S6 in FIG. 4.

Next, plane data indicating each of C, M, Y and K generated in the color conversion process in S5 is compressed (S6). In S7, the data for printing is generated by attaching additional data such as a size of sheets to the compressed data. Subsequently, the data for printing is transmitted to the printer 1 (S8) and the process is terminated.

According to the above print process in the first embodiment, the color conversion operations for the main image M and the watermark W are performed separately, independent of colors of the main image and the watermark. That is, the main image M and the watermark W can be respectively printed in desired colors.

Figure 7:
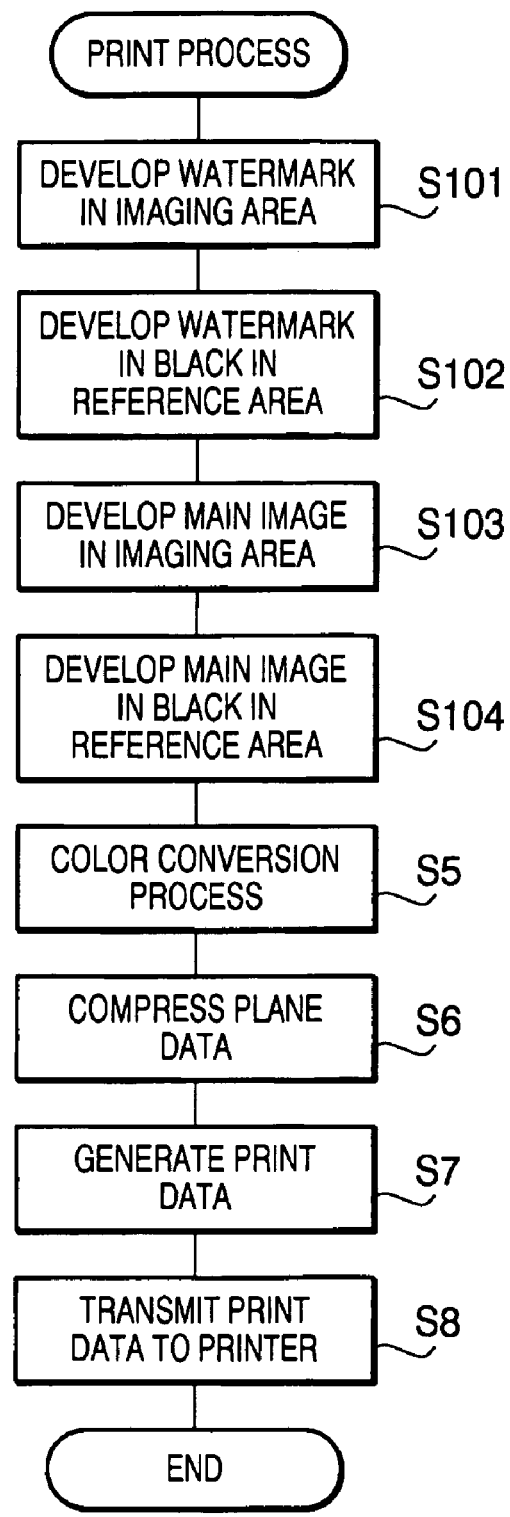
FIG. 7 is a flowchart illustrating a print process according to a second embodiment of the invention.

FIG. 7 is a flowchart illustrating a color conversion process according to a second embodiment of the invention. The color conversion process according to the second embodiment is applied to a case where the main image is superimposed on the watermark.

Figure 8A:
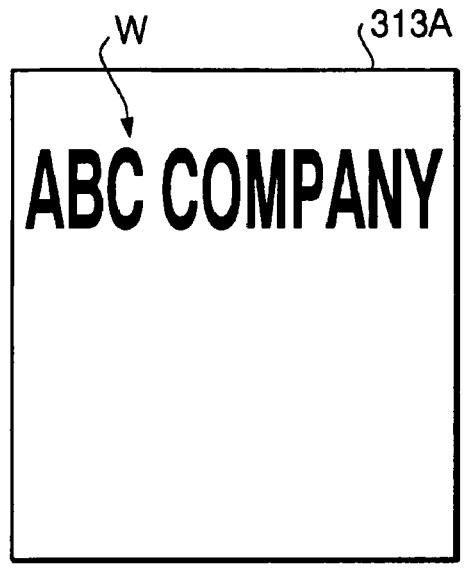
FIGS. 8A and 8C show examples of images developed in the imaging area according to the second embodiment of the invention.
Figure 8B:
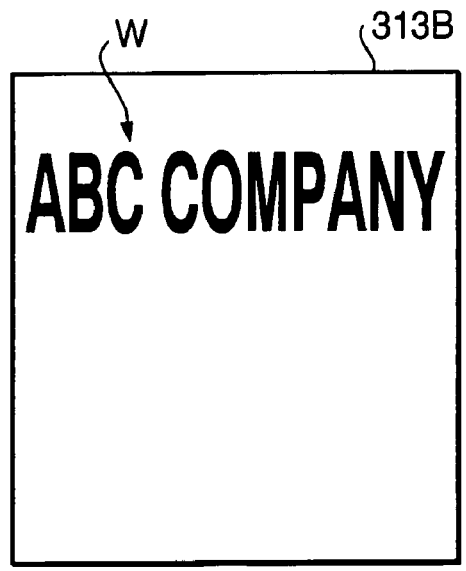
FIGS. 8B and 8D show examples of images in the reference area according to the second embodiment of the invention.

As shown in FIG. 7, when the print instruction is made after setting the parameters with the color conversion parameter setting UI 900, the watermark W is created in the imaging area 313A (S101). Then, the same watermark W is created in the reference area 313B at the corresponding position in black (S102). Thus, as shown in FIGS. 8A and 8B, the watermark W is created in the specific color(s) in the imaging area 313A (S101), and in black in the reference area 313B (S102).

In S103, the main image M is created in the imaging area 313A in accordance with the image forming instruction with respect to the main image data generated by the application. In S104, the main image M is created in the reference area 313B in white (i.e., the color of the background in the reference area 313B). Thus, as shown in FIG. 8B, in the imaging area 313A, an image which is similar to the watermark W but a part thereof is hidden by the main image M is formed (S103), and in the reference area 313B, the position of the watermark W except for a portion hidden by the main image M is created in black (S104).

Figure 8C:
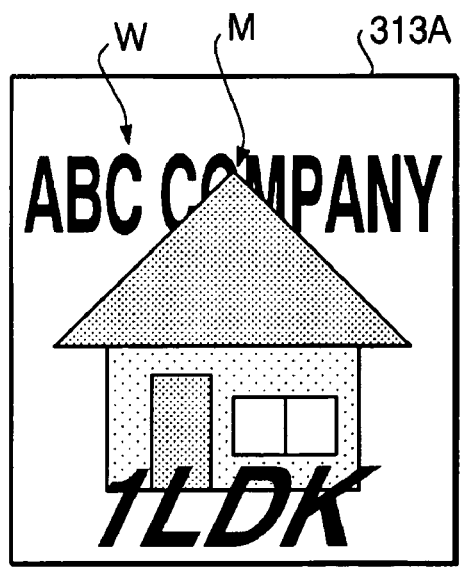
Figure 8D:
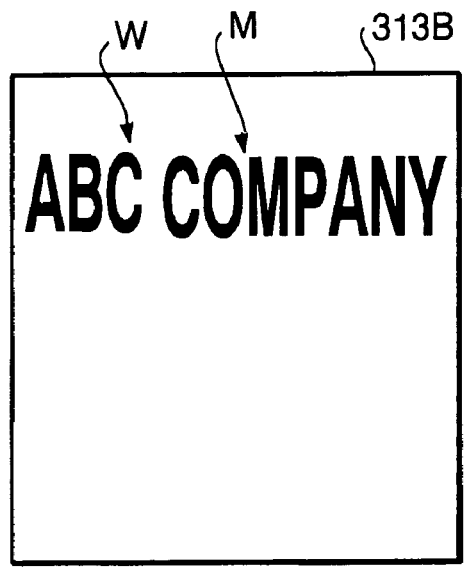

Thus, as shown in FIGS. 8C and 8D, the main image M is superimposed on the watermark W (S104) and the watermark W is stored in black in the reference area 313B except for portions on which the main image data M is superimposed.

After the above process, when the steps S5 through S8 are executed, to portions of the watermark W which are hidden by the main image M, the color conversion using the color conversion parameters for the main image is applied. Therefore, a natural print result can be obtained.

While the color conversion process is performed after the superimposed image is created in the imaging area 313A, the color conversion process may be performed before creating the superimposed image. In such a case, the reference area 313 B can be omitted. According to a third embodiment described below, the color conversion process is performed before the superimposed image is formed.

Figure 9:
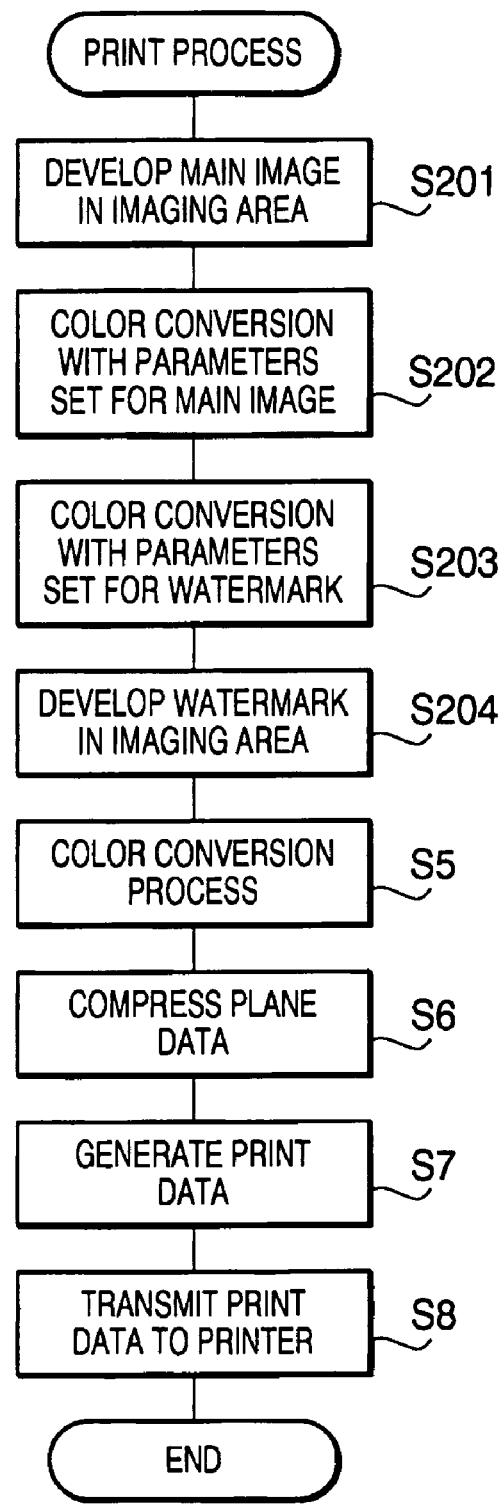
FIG. 9 is a flowchart illustrating a print process according to a third embodiment of the invention.

FIG. 9 is a flowchart illustrating the color conversion process according to the third embodiment. As shown in FIG. 9, when the print instruction is made after setting the parameters using the color conversion parameter setting UI 900, the main image M is formed in the imaging area 313A (S201). Then, a color conversion operation is applied to the main image M in the imaging area 313A (S202) in accordance with the color conversion parameters for the main image M. Next, the color conversion is applied to the watermark W before it is superimposed on the main image M (i.e., the color conversion is applied to the watermark W stored in the RAM 10C) in accordance with the color conversion parameters for the watermark W. Then, the watermark W to which the color conversion was applied is formed in the imaging area 313A (S204). Subsequently, the steps S6 through S8 are performed. According to the above process, a print result which is the same as that obtained in the first embodiment can be obtained.

While the watermark representing the company logo is used as the additional image in the above-described embodiments, any images can be used as the main image and/or the additional image.

In the above-described exemplary embodiments, the color conversion operation using the parameters are performed when RGB multiple-value data is converted into CMYK multiple-value data. It should be noted that the invention need not be limited to such a conversion. That is, the invention may be applied in a case where a gradation step conversion from RGB multiple-value data is converted in to other RGB multiple-value data using the parameters, or a gradation step conversion from CMYK multiple-value data to other CMYK multiple-value data using the parameters.

Further, while the watermark W is formed in black in the reference area 313B in the above embodiments, the watermark W may be formed in any color other than black. Additionally, instead of using the bitmap data in the reference area 313B, another method such as one storing the text data, font data and vector data and a starting position thereof may be employed.

What is claimed is:

1. A print control device, comprising:
a superimposing unit configured to:
generate additional image data representing an additional image to be superimposed on a main image generated by an application, and
generate superimposed image data representing a superimposed image in which the additional image is superimposed on the main image by using the additional image data and the main image data;
an output unit configured to output the superimposed image data generated by the superimposing unit as print data for the print control device;
memory having:
an imaging area in which the superimposed image generated by the superimposing unit is developed, and
a superimposing area in which positions of pixels on a reference area are in one-to-one correspondence with positions of pixels on the imaging area;
a position storing unit configured to store a position of the additional image with respect to the main image by developing the additional image represented by the additional image data in the superimposing area with a predetermined color and subsequently developing the main image represented by the main image data in the superimposing area with a color of a background of the superimposing area, the color of the background of the superimposing area being different from the predetermined color;

a first color conversion unit configured to apply a first color conversion to a first set of one or more pixels of the imaging area by referencing the superimposing area, the first set of one or more pixels corresponding to pixels of the superimposing area having the color of the background of the superimposing area; and a second color conversion unit configured to apply a second color conversion, separate from the first color conversion, to a second set of one or more pixels of the imaging area by referencing the superimposing area, the second set of one or more pixels corresponding to pixels of the superimposing area having the predetermined color, wherein the output unit is configured to output the superimposed image data corresponding to the imaging area to which the first color conversion and the second color conversion are applied by the first color conversion unit and the second color conversion unit, respectively.

2. The print control device according to claim 1, wherein, if a part of the additional image is hidden by the main image, the position storing unit stores the position of the additional image excluding the part hidden by the main image.

3. The print control device according to claim 1, wherein color conversion parameters used by the first color conversion unit and color conversion parameters used by the second color conversion unit are independently defined.

4. A print control device which generates a superimposed image by superimposing an additional image represented by additional image data on a main image represented by main image data and outputs print data representing the superimposed image to be printed by a printer, comprising:

a main image developing unit configured to develop the main image on a first memory area based on the main image data;

a reference image developing unit configured to develop the additional image on a second memory area which has the same size as the first memory area, wherein the reference image developing unit develops the additional image on the second memory area in a first color and wherein pixels of the first memory area have a one-to-one correspondence with pixels of the second memory area;

a superimposed image developing unit configured to develop the additional image on the first memory area so as to be superimposed on the main image based on the additional image data;

a first color conversion applying unit configured to apply a first color conversion to the image developed on the first memory area such that the first color conversion is applied to pixels of the first memory area corresponding to pixels of the second memory area not having the first color;

a second color conversion applying unit configured to apply a second color conversion to pixels of the first memory area that correspond to pixels of the second memory area having the first color; and a print data output unit configured to output the print data representing the image in the first memory area after the first color conversion and the second color conversion are applied.

5. The print control device according to claim 4, wherein, if a part of the additional image is hidden by the main image, the reference image developing unit develops the additional image data excluding the part hidden by the main image on the second memory area.

6. The print control device according to claim 4, wherein color conversion parameters used by the first color conversion unit and color conversion parameters used by the second color conversion unit are independently defined.

7. The print control device according to claim 6, further comprising color conversion parameters setting unit configured to allow setting of the color conversion parameters for the first color conversion and the color conversion parameters for the second conversion parameters independently.

8. A print control device which generates a superimposed image by superimposing an additional image represented by additional image data on a main image represented by main image data and outputs print data representing the superimposed image to be printed by a printer, comprising:

memory storing a first image area and a second image area, wherein the main image is developed in the first image area and the additional image is developed in the second image area in a predefined color and wherein pixels of the first image area and pixels of the second image area have a one-to-one correspondence;

a first color conversion applying unit configured to apply a first color conversion to main image data in the first image area by identifying a first set of one or more pixels of the first image area corresponding to pixels of the second image area of the predefined color and applying the first color conversion to the first set of one or more pixels;

a second color conversion applying unit configured to apply a second color conversion to additional image data in the first image area by identifying a second set of one or more pixels of the first image area corresponding to one or more pixels of the second image area of the predefined color and applying the second color conversion to the second set of one or more pixels;

a superimposing unit configured to generate superimposed image data representing the main image on which the additional image is superimposed after the first color conversion and the second color conversion are applied; and a print data output unit configured to output the superimposed image data as the print data.

9. A non-transitory computer accessible recording medium storing computer readable instructions that, when executed by a computer, cause the computer to generate a superimposed image by superimposing an additional image represented by additional image data on a main image represented by main image data and output print data representing the superimposed image to be printed by a printer, the instructions causing the computer to execute steps of:

developing the main image on a first memory area based on the main image data;

developing the additional image on the first memory area so as to be superimposed on the main image based on the additional image data;

developing the additional image in a predefined color on a second memory area which has the same size as the first memory area, wherein pixels of the first memory area have a one-to-one correspondence with pixels of the second memory area;

applying a first color conversion to a first set of one or more pixels of the image developed on the first memory area upon determining that one or more pixels of the second image area corresponding to the first set of one or more pixels of the first memory area are not of the predefined color;

applying a second color conversion, independently of the first color conversion, to a second set of one or more pixels of the image developed on the first memory area upon determining that one or more pixels of the second memory area corresponding to the second set of one or more pixels of the first memory area are of the predefined color; and outputting the print data representing the image in the first memory area after the first color conversion and the second color conversion are applied.

10. A method comprising:

generating a first image in a first memory area of a computing device;

generating a second image in the first memory area of the computing device, wherein the second image is superimposed over at least a portion of the first image;

generating the second image in a predefined color in a second memory area separate from the first memory area, wherein the first memory area and second memory area are of the same size and have a one-to-one pixel correspondence and wherein the second image is generated in the same location in the second memory area as in the first memory area;

for each pixel in the first memory area, determining whether a corresponding pixel of the second memory area is the predefined color;

in response to determining that the corresponding pixel of the second memory area is not the predefined color, applying a first color conversion to the pixel of the first memory area; and in response to determining that the corresponding pixel of the second memory area is the predefined color, applying a second color conversion to the pixel.

* * * * *